United States Patent
Rozell et al.

(10) Patent No.: US 8,688,490 B2
(45) Date of Patent: Apr. 1, 2014

(54) SYSTEM AND METHOD FOR DETERMINING A HOTEL MARKETABILITY INDEX SCORE IN A NETWORK ENVIRONMENT

(75) Inventors: James M. Rozell, Arlington, TX (US); Bernard A. Phillips, Flower Mound, TX (US)

(73) Assignee: Travelweb LLC, Stamford, CT (US)

( * ) Notice: Subject to any disclaimer, the term of this patent is extended or adjusted under 35 U.S.C. 154(b) by 277 days.

(21) Appl. No.: 12/911,828

(22) Filed: Oct. 26, 2010

(65) Prior Publication Data

US 2011/0106583 A1    May 5, 2011

Related U.S. Application Data

(62) Division of application No. 10/613,204, filed on Jul. 3, 2003, now Pat. No. 7,848,945.

(51) Int. Cl.
*G06Q 10/00* (2012.01)

(52) U.S. Cl.
USPC ........................................ 705/7.11

(58) Field of Classification Search
USPC ........................................ 705/7.11
See application file for complete search history.

(56) References Cited

U.S. PATENT DOCUMENTS

| | | | | |
|---|---|---|---|---|
| 5,021,952 A * | 6/1991 | Nishimura et al. | | 705/30 |
| 5,832,452 A * | 11/1998 | Schneider et al. | | 705/5 |
| 5,893,093 A * | 4/1999 | Wills | | 1/1 |
| 6,304,850 B1 * | 10/2001 | Keller et al. | | 705/5 |
| 6,324,517 B1 * | 11/2001 | Bingham et al. | | 705/7.24 |
| 6,381,465 B1 * | 4/2002 | Chern et al. | | 455/466 |
| 6,615,186 B1 * | 9/2003 | Kolls | | 705/14.51 |
| 6,668,177 B2 * | 12/2003 | Salmimaa et al. | | 455/566 |
| 6,735,572 B2 * | 5/2004 | Landesmann | | 705/14.39 |
| 6,807,480 B1 * | 10/2004 | Iwasaki et al. | | 701/410 |
| 6,993,503 B1 * | 1/2006 | Heissenbuttel et al. | | 705/37 |
| 7,007,228 B1 * | 2/2006 | Carro | | 715/210 |
| 7,080,021 B1 * | 7/2006 | McCulloch | | 705/5 |
| 7,124,096 B2 * | 10/2006 | Dutta et al. | | 705/26.61 |
| 7,302,429 B1 * | 11/2007 | Wanker | | 1/1 |
| 7,333,941 B1 * | 2/2008 | Choi | | 705/5 |
| 7,640,232 B2 * | 12/2009 | Fish et al. | | 1/1 |
| 7,668,809 B1 * | 2/2010 | Kelly et al. | | 707/713 |
| 7,668,811 B2 * | 2/2010 | Janssens et al. | | 707/719 |
| 7,672,883 B2 * | 3/2010 | Harford et al. | | 705/35 |
| 7,693,750 B2 * | 4/2010 | Christensen | | 705/14.1 |
| 7,761,305 B2 * | 7/2010 | Mack | | 705/1.1 |
| 7,761,314 B2 * | 7/2010 | Fitzgerald et al. | | 705/5 |

(Continued)

OTHER PUBLICATIONS

Reynolds, Christopher, Hotel rating systems leave plenty of room for doubt Baltimore Sun, Feb. 7, 1999.*

(Continued)

*Primary Examiner* — Scott L Jarrett
(74) *Attorney, Agent, or Firm* — Cooley LLP; Walter G. Hanchuk; Nathan W. Poulsen

(57) ABSTRACT

A method for evaluating travel accommodations is provided that includes identifying a plurality of hotel properties and assigning a hotel marketability index score to one or more of the properties such that one or more of the properties may be ranked. The hotel marketability index score may be based on a selected one or more characteristics associated with one or more of the hotel properties, the characteristics including rate competitiveness, hotel availability, hotel location within a cluster location, and hotel quality within the cluster location.

18 Claims, 6 Drawing Sheets

| | CONSUMER EVENT | | | | | |
|---|---|---|---|---|---|---|
| INDEX | SEARCHES BY GENERAL MARKET | SEARCHES BY SPECIFIC CLUSTER | SORT BY RATE | SORTS BY STAR RATING | SORTS BY PROXIMITY | SORTS BY VALUE |
| RATE WITHIN STAR | | | ⇧ | ⇧ | ⇩ | ⇩ |
| RATE WITHIN CLUSTER | ⇩ | ⇧ | ⇧ | ⇩ | ⇩ | ⇩ |
| RATE WITHIN MARKET | ⇧ | ⇩ | ⇧ | ⇩ | ⇩ | ⇩ |
| VALUE TO RETAIL | | | ⇧ | | | ⇧ |
| COMPETING ENTITIES | | | | | | |
| AVAILABILITY | | | | | | |
| STAR QUALITY | | | ⇩ | ⇧ | | |
| PROXIMITY | ⇧ | ⇩ | ⇩ | | ⇧ | |

800

(56) References Cited

U.S. PATENT DOCUMENTS

| | | | | |
|---|---|---|---|---|
| 7,769,611 | B1* | 8/2010 | Rodriguez et al. | 705/7.11 |
| 7,848,945 | B2* | 12/2010 | Rozell et al. | 705/7.34 |
| 2001/0003815 | A1* | 6/2001 | Nakano | 707/1 |
| 2001/0034623 | A1* | 10/2001 | Chung | 705/5 |
| 2001/0053989 | A1* | 12/2001 | Keller et al. | 705/5 |
| 2002/0065689 | A1* | 5/2002 | Bingham et al. | 705/5 |
| 2003/0088553 | A1* | 5/2003 | Monteverde | 707/3 |
| 2003/0110063 | A1* | 6/2003 | Among et al. | 705/6 |
| 2003/0125994 | A1* | 7/2003 | Jaehn et al. | 705/5 |
| 2003/0182413 | A1* | 9/2003 | Allen et al. | 709/223 |
| 2004/0009827 | A1* | 1/2004 | Oyama | 473/319 |
| 2004/0010578 | A1* | 1/2004 | Demetriades et al. | 709/223 |
| 2004/0199429 | A1* | 10/2004 | Kwoh | 705/26 |
| 2005/0086086 | A1* | 4/2005 | Mack | 705/5 |
| 2006/0059024 | A1* | 3/2006 | Bailey et al. | 705/5 |
| 2007/0179791 | A1* | 8/2007 | Ramesh et al. | 705/1 |
| 2011/0034625 | A1* | 2/2011 | Grassl et al. | 524/561 |

OTHER PUBLICATIONS

Yu, Lawrence, Seeing Stars: China's Hote-Rating System Cornell Hotel and Restaurant Administration Quarterly, vol. 33, No. 5, Oct. 1992.*

Lodging's 400 Top Performers Lodging Hospitality, vol. 48, No. 8, Aug. 1992.*

Gayot.com—Hotel Rating System Gayot, Oct. 20, 2002, Retrieved from Archive.org.*

HotelRes.com—Value Index Topaz Hotel Services, Nov. 28, 2001, Retrieved from Archive.org.*

Gayot.com web pages Gayot, Jun. 4, 2002, Retrieved from Archive.org Oct. 25, 2013.*

TripAdvisor.com web pages TripAdvisor, Jun. 6, 2002, Retrieved from Archive.org Oct. 25, 2013.*

TripAdvisor announces Hotel Popularity Index: Travel search engine provides first index to rank 75,000 hotels worldwide based on input from the web, Nov. 22, 2002, TripAdvisor.com.*

HotelRes.com web pages Topaz Hotel Services, Sep. 10, 2001, Retrieved from Archive.org Oct. 25, 2013.*

Dolnicar, Sara et al., Which Hotel attributes Matter? A review of previous and a framework for future research University of Wollongong, 2003.*

Chaisawat, Chanop, Advances in Hospitatilty and Tourism Research—vol. III Hotel-Online.com, 1998.*

"Booking a Hotel Room Online is i-DEAL with Travelweb.com," Business Wire, Jun. 18, 2003, p. 1.

Sheryl E. Kimes, "How Product Quality Drives Profitability: The Experience at Holiday Inn (Product quality improves profitability)," Cornell Hotel & Restaurant Administration Quarterly, v. 42, n. 3, Jun. 2001, p. 25.

"The world's best hotels.(Statistical Data Included)," Institutional Investor International Edition, v. 26, n. 9, Sep. 2001, p. 157.

Travelweb: Hotel Reservations and Flight Reservations, www.travelweb.com, Apr. 7, 2000 (as retrieved from the Internet Archive Wayback Machine [web.archive.org] on Aug. 22, 2008).

Welcome to TripAdvisor!,.www.tripadvisor.com, Mar. 1, 2001 (as retrieved from the Internet Archive Wayback Machine [web.archive.org] on Aug. 23, 2008).

* cited by examiner

FIG. 5 RATE COMPETITIVENESS 400

| CLUSTER = MIDTOWN EAST | | | |
|---|---|---|---|
| PROPERTY NAME | NUMBER OF AVAILABILITY REQUESTS | AVERAGE LOWEST RATE RETURNED | PRICE TO CLUSTER INDEX |
| OMNI BERKSHIRE PLACE | 4,050 | $150 | 1.154 |
| AIRWAY INN | 8,500 | $140 | 1.236 |
| HOLIDAY INN EXPRESS QUEENS/MIDTOWN TUNNEL | 6,500 | $180 | 0.961 |
| THE STANHOPE A PARK HYATT HOTEL | 3,500 | $220 | 0.787 |
| MILLENNIUM HOTEL NEW YORK UN PLAZA | 7,500 | $135 | 1.282 |
| HABITAT HOTEL | 4,500 | $90 | 1.923 |
| COURTYARD BY MARRIOTT MIDTOWN EAST | 7,300 | $135 | 1.282 |
| LOMBARDY HOTEL | 3,900 | $122 | 1.418 |
| SWISSOTEL NEW YORK THE DRAKE | 8,200 | $205 | 0.844 |
| CROWNE PLAZA AT THE UNITED NATIONS NY | 9,800 | $175 | 0.989 |
| GRAND HYATT NEW YORK | 6,000 | $250 | 0.692 |
| W NEW YORK | 7,000 | $240 | 0.721 |
| NEW YORK MARRIOTT EAST SIDE 337N4 | 3,500 | $155 | 1.116 |
| RADISSON LEXINGTON HOTEL NEW YORK | 2,900 | $109 | 1.588 |
| THE ST. REGIS | 6,200 | $99 | 1.748 |
| HOTEL INTER-CONTINENTAL NEW YORK | 6,100 | $229 | 0.756 |
| THE PLAZA | 2,500 | $355 | 0.487 |
| WEIGHTED AVERAGE RATE | | $173.04 | |

402

FIG. 6  HOTEL AVAILABILITY  500

| OMNI BERKSHIRE PLACE | | | | | | |
|---|---|---|---|---|---|---|
| ONE NIGHT STAYS | | | | | | |
| RQSTS 3/16/2003 | 3/17/2003 | 3/18/2003 | 3/19/2003 | 3/20/2003 | 3/21/2003 | 3/22/2003 |
| AVAIL 60 | 40 | 80 | 50 | 15 | 15 | 20  502 |
| % 100% | 100% | 100% | 100% | 100% | 100% | 0% |
| RQSTS 3/23/2003 | 3/24/2003 | 3/25/2003 | 3/26/2003 | 3/27/2003 | 3/28/2003 | 3/29/2003 |
| AVAIL 10 | 8 | 5 | 0 | 25 | 15 | 5  504 |
| % 100% | 100% | 100% | 0% | 50% | 50% | 0% |
| RQSTS 3/30/2003 | 3/31/2003 | 4/1/2003 | 4/2/2003 | 4/3/2003 | 4/4/2003 | 4/5/2003 |
| AVAIL 6 | 3 | 4 | 5 | 3 | 10 | 7  506 |
| % 100% | 100% | 100% | 100% | 100% | 100% | 0% |
| RQSTS 4/6/2003 | 4/7/2003 | 4/8/2003 | 4/9/2003 | 4/10/2003 | 4/11/2003 | 4/12/2003 |
| AVAIL 11 | 0 | 7 | 7 | 8    520 | 9 | 11  508 |
| % 100% | 0% | 100% | 100% | 100% | 100% | 0% |
| RQSTS 4/13/2003 | 4/14/2003 | 31-60 DAYS | 61-90 DAYS | 91-120 DAYS | 121-180 DAYS | 181+DAYS |
| AVAIL 4 | 5 | 20 | 25 | 20 | 15 | 10 |
| % 100% | 100% | 50% | 50% | 0% | 0% | 0% |
| 2 NIGHT STAYS | | | | | | |
| RQSTS 3/16/2003 | 3/17/2003 | 3/18/2003 | 3/19/2003 | 3/20/2003 | 3/21/2003 | 3/22/2003 |
| AVAIL 55 | 36 | 78 | 50 | 12 | 17 | 25 |
| % 100% | 100% | 100% | 100% | 100% | 100% | 100% |
| RQSTS 3/23/2003 | 3/24/2003 | 3/25/2003 | 3/26/2003 | 3/27/2003 | 3/28/2003 | 3/29/2003 |
| AVAIL 9 | 5 | 2 | 8 | 0 | 0 | 20 |
| % 100% | 100% | 100% | 100% | #DIV/0! | #DIV/0! | 100% |
| RQSTS 3/30/2003 | 3/31/2003 | 4/1/2003 | 4/2/2003 | 4/3/2003 | 4/4/2003 | 4/5/2003 |
| AVAIL 3 | 4 | 5 | 11 | 15 | 10 | 9 |
| % 100% | 100% | 100% | 100% | 100% | 100% | 100% |
| RQSTS 4/6/2003 | 4/7/2003 | 4/8/2003 | 4/9/2003 | 4/10/2003 | 4/11/2003 | 4/12/2003 |
| AVAIL 15 | 12 | 8 | 25 | 25   522 | 10 | 17 |
| % 100% | 100% | 100% | 100% | 100% | 100% | 100% |
| RQSTS 4/13/2003 | 4/14/2003 | 31-60 DAYS | 61-90 DAYS | 91-120 DAYS | 121-180 DAYS | 181+DAYS |
| AVAIL 6 | 5 | 40 | 25 | 18 | 15 | 12 |
| % 100% | 100% | 100% | 50% | 0% | 0% | 0% |
| MORE THAN 2 NIGHT STAYS | | | | | | |
| RQSTS 3/16/2003 | 3/17/2003 | 3/18/2003 | 3/19/2003 | 3/20/2003 | 3/21/2003 | 3/22/2003 |
| AVAIL 18 | 12 | 26 | 17 | 4 | 6 | 8 |
| % 0% | 0% | 0% | 0% | 0% | 0% | 0% |
| RQSTS 3/23/2003 | 3/24/2003 | 3/25/2003 | 3/26/2003 | 3/27/2003 | 3/28/2003 | 3/29/2003 |
| AVAIL 3 | 2 | 1 | 3 | 0 | 0 | 7 |
| % 0% | 0% | 0% | 0% | 0% | 0% | 0% |
| RQSTS 3/30/2003 | 3/31/2003 | 4/1/2003 | 4/2/2003 | 4/3/2003 | 4/4/2003 | 4/5/2003 |
| AVAIL 1 | 1 | 2 | 4 | 5 | 3 | 3 |
| % 0% | 0% | 0% | 0% | 0% | 0% | 0% |
| RQSTS 4/6/2003 | 4/7/2003 | 4/8/2003 | 4/9/2003 | 4/10/2003 | 4/11/2003 | 4/12/2003 |
| AVAIL 5 | 4 | 3 | 8 | 8    524 | 3 | 6 |
| % 0% | 0% | 0% | 0% | 0% | 0% | 0% |
| RQSTS 4/13/2003 | 4/14/2003 | 31-60 DAYS | 61-90 DAYS | 91-120 DAYS | 121-180 DAYS | 181+DAYS |
| AVAIL 2 | 2 | 13 | 8 | 6 | 5 | 4 |
| % 0% | 0% | 100% | 100% | 100% | 100% | 100% |

FIG. 7    RELATIVE STAR QUALITY    600 

| CLUSTER=MIDTOWN EAST | | |
|---|---|---|
| PROPERTY NAME | STAR RATING | STAR INDEX |
| HOTEL INTER-CONTINENTAL NEW YORK | 4 | 1.169 |
| THE PLAZA | 3 | 0.877 |
| THE WALDORF ASTORIA | 4 | 1.169 |
| ENVOY CLUB | 3 | 0.877 |
| THE ST. REGIS | 3 | 0.877 |
| SHERATON RUSSELL HOTEL | 3 | 0.877 |
| BUCKINGHAM HOTEL | 3 | 0.877 |
| INTER-CONTINENTAL CENTRAL PARK SOUTH NEW YORK | 4 | 1.169 |
| WARWICK HOTEL | 4 | 1.169 |
| ESSEX HOUSE - A WESTIN HOTEL | 4 | 1.169 |
| THE ST. REGIS CLUB AT THE ESSEX HOUSE NEW YORK | 3 | 0.877 |
| W NEW YORK - THE TUSCANY | 4 | 1.169 |
| W NEW YORK - THE COURT | 4 | 1.169 |
| HILTON NEW YORK | 4 | 1.169 |
| LE PARKER MERIDIEN | 3 | 0.877 |
| AMSTERDAM INN | 3 | 0.877 |
| RIHGA ROYAL NEW YORK-A JW MARRIOTT HOTEL | 4 | 1.169 |
| KITANO NEW YORK HOTEL | 3 | 0.877 |
| CLUB QUARTERS MIDTOWN | 2 | 0.585 |
| AVERAGE STAR INDEX | 3.42 | |

FIG. 8A

| MARKET | RATE/MARGIN COMPETITIVENESS INDICES | | | | | QUALITY | AVAILABILITY | PROXIMITY |
| --- | --- | --- | --- | --- | --- | --- | --- | --- |
| | WITHIN CLUSTER | WITHIN MARKET | WITHIN STAR QUALITY | VS. COMPETING ENTITY | VALUE TO RETAIL | STAR WITHIN CLUSTER | PERCENT AVAILABLE | MILES FROM CITY CENTER |
| DEFAULT | 10 | 10 | 10 | 10 | 40 | 10 | 90 | 20 |
| NEW YORK | 10 | 10 | 10 | 10 | 40 | 10 | 60 | 50 |
| SAN FRANCISCO | 10 | 10 | 10 | 10 | 40 | 30 | 70 | 20 |
| DALLAS | 20 | 20 | 20 | 10 | 40 | 10 | 70 | 10 |

| INDEX | CONSUMER EVENT | | | | | | |
| --- | --- | --- | --- | --- | --- | --- | --- |
| | SEARCHES BY GENERAL MARKET | SEARCHES BY SPECIFIC CLUSTER | SORT BY RATE | SORTS BY STAR RATING | SORTS BY PROXIMITY | SORTS BY VALUE | |
| RATE WITHIN STAR | | | ⇐ | ⇐ | | | |
| RATE WITHIN CLUSTER | ⇒ | ⇐ | ⇐ | ⇒ | ⇒ | ⇒ | |
| RATE WITHIN MARKET | ⇐ | ⇒ | ⇐ | ⇒ | ⇒ | ⇒ | |
| VALUE TO RETAIL | | | ⇐ | | | ⇐ | |
| COMPETING ENTITIES | | | ⇒ | | | | |
| AVAILABILITY | ⇐ | ⇒ | ⇒ | ⇐ | | | |
| STAR QUALITY | | | | | ⇐ | | |
| PROXIMITY | | | | | | | |

800

SYSTEM AND METHOD FOR DETERMINING A HOTEL MARKETABILITY INDEX SCORE IN A NETWORK ENVIRONMENT

PRIORITY CLAIM AND RELATED APPLICATIONS

This application is a Divisional of and claims priority under 35 U.S.C. §120 to prior U.S. Non-Provisional patent application Ser. No. 10/613,204, filed Jul. 3, 2003 now U.S. Pat. No. 7,848,945 entitled, "SYSTEM AND METHOD FOR INDEXING TRAVEL ACCOMMODATIONS IN A NETWORK ENVIRONMENT". The entire contents of the aforementioned application are herein expressly incorporated by reference.

TECHNICAL FIELD OF THE INVENTION

This invention relates in general to travel management and, more particularly, to a system and method for indexing travel accommodations in a network environment.

BACKGROUND OF THE INVENTION

Computers and networking architectures have had a dramatic effect on the travel industry. Travel accommodation systems that employ the use of digital communications may offer a number of capabilities and options to a given traveler or end user. Such options may include providing a potential lodging property based on a city that was selected by the end user. Such capabilities may include the ability to provide travel arrangements for a prolific number of end users. These features, which are provided by many current travel accommodation systems, have contributed to a significant augmentation in the number of end users that are afforded the opportunity to secure appropriate travel arrangements by accessing a network and/or using a computer or an electronic device.

As the consumer base continues to expand, so too do the demands and preferences of the travel industry's customers and clients. Additionally, the average traveler continues to develop in sophistication such that he/she may seek travel arrangements that are precise and that account for a number of activities or time constraints that may be associated with a given trip. In attempting to address the needs of today's traveler, it is important to maintain a minimal level of complexity for a given travel accommodation system, as an end user should be afforded the opportunity to identify and secure reasonable travel accommodations with nominal effort. In addition, securement of the targeted travel accommodations should be simple enough such that a salesperson is not necessarily involved in the process. Moreover, executing and confirming travel arrangements should be performed quickly and accurately, as timing is often critical to the booking process. Accordingly, the ability to effectively manage the needs and requirements of today's sophisticated traveler, while providing an architecture that may accommodate a number of users and that is simple to utilize, provides a significant challenge to market participants in the travel industry.

SUMMARY OF THE INVENTION

From the foregoing, it may be appreciated by those skilled in the art that a need has arisen for an improved travel accommodation indexing-architecture that provides for enhanced flexibility by accounting for the diverse needs of a number of participating end users. In accordance with one embodiment of the present invention, a system and method for indexing travel accommodations in a network environment are provided that substantially eliminate or greatly reduce disadvantages and problems associated with conventional travel industry tools.

According to one embodiment of the present invention, there is provided a method for indexing travel accommodations in a network environment that includes identifying a plurality of hotel properties and assigning a hotel marketability index score to one or more of the properties such that one or more of the properties may be ranked. The hotel marketability index score may be based on a selected one or more characteristics associated with one or more of the hotel properties, the characteristics including rate competitiveness, hotel availability, hotel location within a cluster location, and hotel quality within the cluster location.

According to another embodiment of the present invention, there is provided a method for storing information about an end user that includes storing data associated with one or more travel characteristics of an end user in a profile. The profile may be coupled to a hotel marketability index element that is operable to identify a plurality of hotel properties and to assign a hotel marketability index score to one or more of the properties such that one or more of the properties may be ranked. The hotel marketability index score may be based on a selected one or more characteristics associated with one or more of the hotel properties, the characteristics including rate competitiveness, hotel availability, hotel location within a cluster location, and hotel quality within the cluster location.

Certain embodiments of the present invention may provide a number of technical advantages. For example, according to one embodiment of the present invention, a hotel marketability index element is provided that offers a consistent and an accurate scale to be used by an end user in evaluating a host of potential travel accommodations. The hotel marketability index element may suitably categorize a series of properties such that they may be ranked based on criteria selected by the end user and system parameters as selected by a system administrator. A series of scores may then be offered to the end user such that he may make an educated and price-conscious choice for lodging based on the scoring system. In one general sense, more information is being offered to an end user such that his travel accommodation decision is an informed one. The scoring system may preference properties based on a number of selected parameters that are processed by the hotel marketability index element.

Another technical advantage associated with one embodiment of the present invention relates to its flexibility. The results of various hotel marketability index components may be multiplied by weights and summed into a single score. One analysis of existing data may indicate that one factor (e.g. hotel availability) should have significant weight on the resultant score. Thus, particular important index components may be used to modify or affect the resultant score based on particular selections of the end user or particular circumstances associated with the targeted lodging pool. In certain cases, a system designer may choose to assign more weight to a given index component because of a particular event that may be occurring during the time frame associated with the lodging search. Other weighting processes may vary depending on the type of search made by an end user.

Yet another technical advantage associated with one embodiment of the present invention is a result of the accessibility of the hotel marketability index element. The hotel marketability index element may be used by a hosting entity in providing feedback information or consultations to a supplier: the information potentially relating to how to improve their hotel marketability index score. Thus, a hosting entity may communicate with existing properties or attract new properties by communicating weaknesses or strengths of their respective lodging (with regards to rates, availability and location), which may affect their potential ranking. Accordingly, hotel managers are better able to address deficiencies such that their overall score may improve, while simultaneously the consumer base is benefiting from the improvement to the lodgings and the greater attention being paid to problematic areas for the lodging that is being evaluated. Performance indicators may also be provided (e.g. via a monthly or semi-annual report) to participating hotel corporations and companies, the report reflecting how their properties are currently being displayed on the hotel marketability index system and/or how such entities can improve their screen placement.

Still another technical advantage associated with one embodiment of the present invention relates to an interface that may be utilized in order to interact with a consumer. An end user is provided an opportunity to set up a profile for himself (or others) and use the hotel marketability index process in addressing his specific lodging needs. In certain embodiments, coupons or reduced-price alerts could be generated to specific end users based on their preferences, or based on previously-selected lodging accommodations (potentially coupled with the likelihood that such consumers would be interested in the identified properties). Thus, automatic e-mails could be generated for consumers when a certain set of criteria, which may be provided by the end user, are matched in the system. End user profiles may be modified, updated, or otherwise changed in any suitable manner. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 5 is a simplified web-page illustration that shows an example operation, which offers a rate being provided within a cluster index, in accordance with one embodiment of the present invention;

FIG. 6 is a simplified web-page illustration that shows an example operation, which offers a hotel availability sampling, in accordance with one embodiment of the present invention;

FIG. 7 is a simplified web-page illustration that shows an example operation, which offers a relative star quality sampling, in accordance with one embodiment of the present invention;

FIG. 8A is a simplified web-page illustration that shows an example of weighting components into a single score within the travel accommodation system in accordance with one embodiment of the present invention; and FIG. 8B is a simplified web-page illustration that shows an additional example of weighting components into a single score within the travel accommodation system in accordance with one embodiment of the present invention.

DETAILED DESCRIPTION OF EXAMPLE
EMBODIMENTS OF THE PRESENT
INVENTION

Figure 1:
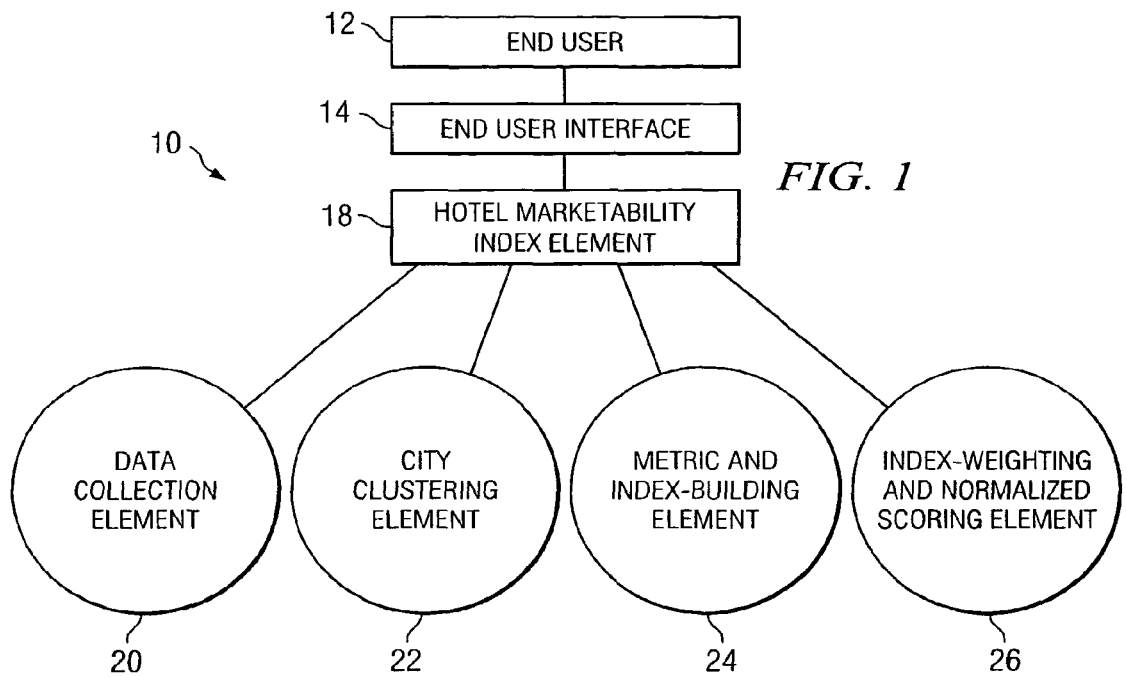
FIG. 1 is a simplified block diagram of a travel accommodation system for indexing travel accommodations in a network environment in accordance with one embodiment of the present invention.

FIG. 1 is a simplified block diagram of a travel accommodation system 10 for indexing travel accommodations or properties in a network environment in accordance with one embodiment of the present invention. System 10 comprises an end user 12, an end user interface 14, and a hotel marketability index element 18. Additionally, system 10 comprises a series of elements that may be coupled to hotel marketability index element 18, including a data collection element 20, a city clustering element 22, a metric and index-building element 24, and an index-weighting and normalized-scoring element 26. One or more of the elements included within system 10 may be included in any suitable network environment or digital application. In addition, system 10 may be provided in conjunction with any appropriate travel accommodation tool or architecture such that end user 12 is provided with some ability to access hotel marketability index element 18 in an electronic, digital, or network environment.

In accordance with the teachings of the present invention, system 10 operates to provide an architecture capable of indexing a series of properties such that they may be ranked based on selected criteria and system parameters. The criteria may be designated by end user 12 and/or assigned by an administrator or a designer of hotel marketability index element 18. A default set of system values may also be provided. Hotel marketability index element 18 may execute a scoring process that preferences properties based on the likelihood of a sales conversion within a geographic region or cluster. Hotel properties may be clustered using latitude and longitude data associated with selected geographic areas. Hotel marketability index element 18 may collect data from a variety of sources such as, for example, data collection element 20 or city clustering element 22. The data may then be used in invoking metric and index-building element 24 and/or index-weighting and normalized-scoring element 26 in order to produce a resultant set of properties to be displayed to end user 12.

In order to create a hotel marketability index score, the results of the various hotel marketability index components may be multiplied by weights and summed into a single score. One analysis of existing data may indicate that two factors should have significant weight in the score: hotel availability and value to retail. Other weighting may vary depending on the type of search made by end user 12 or assignments of a system administrator. A number of parameters may be used as criteria in order to provide end user 12 with a suitable selection of travel accommodations. In one example embodiment, rate competitiveness, hotel availability, hotel location within the cluster (proximity), and hotel quality within the cluster (potentially star-based) are used. Rate competitiveness may be generally based on data collected from two primary sources: availability requests and automated shopping results. In one embodiment, the data may be used to build five measures of rate competitive indices: 1) rate within a cluster; 2) rate within star quality; 3) rate within a market; 4) rate on other competing sites; and 5) value to retail. Those elements may be processed in order to produce one component of an overall property score. Additional processes may be utilized in order to derive the other components that form a hotel marketability index score. Details relating to these additional components are provided below with reference to FIGS. 2-8B.

Hotel marketability index element 18 may be used to determine which hotels will be displayed to end user 12 and in what order the properties will be displayed when consumers search for appropriate accommodations. For example, a list of twenty to twenty-five hotels that match some or all of a specified criteria may be initially displayed in a hierarchical manner based on their index scores. It is intended that these displayed items will result in a converted sale by end user 12.

End user 12 is a client, a consumer, a prospective customer, or an entity wishing to access or to initiate a communication with hotel marketability index element 18. Alternatively, end user 12 may be any device or object that seeks to initiate a communication on behalf of another entity or element, such as a program, a database, or any other component, device, element, or object capable of initiating a data, script, or voice exchange within system 10. Data, as used herein in this document, refers to any type of numeric, voice, or script data, or any other suitable information in any appropriate format that may be communicated from one point to another. In an example embodiment, end user 12 is a traveler seeking suitable lodging, whereby information about the lodging pool is provided by hotel marketability index element 18. End user 12 may be seeking to review certain characteristics or parameters associated with a given set of properties such that he/she/it can choose optimal travel accommodations based on particular needs.

End user interface 14 is a central processing unit (CPU) in accordance with one embodiment of the present invention. End user interface 14 may be employed by end user 12 in order to initiate communications with any number of elements within system 10, such as hotel marketability index element 18, for example. Alternatively, end user interface 14 may be any other suitable interface that facilitates communications between end user 12 and any element within system 10, such as: a cellular telephone, a personal computer, an electronic notebook, a personal digital assistant (PDA), or any other suitable device (wireless or otherwise), component, element, or object capable of accessing one or more elements within system 10. End user interface 14 may also comprise any suitable interface for a human user such as a display, a microphone, a keyboard, or any other appropriate terminal equipment according to particular configurations and arrangements. In addition, end user interface 14 may be a unique element designed specifically for communications involving hotel marketability index element 18. Such an element may be fabricated or produced specifically for travel-inquiry applications involving end user 12 and other elements within system 10.

Note also that end user interface 14 may be utilized in order to interact with a consumer in other appropriate fashions. For example, end user 12 may set up a profile for himself (or others) and use the hotel marketability index process in addressing his specific needs. Such a personal profile may be stored in hotel marketability index element 18 or provided in any other suitable location external thereto. Additionally, coupons (inclusive of reduced-price alerts) may be generated for specific users and communicated electronically or via the standard mailing system. The coupons may be based on end-user preferences or based on previously selected accommodations and the likelihood that the identified properties would interest the receiving end user and/or result in a sales conversion. Thus, automatic e-mails could be generated by system 10 for consumers when a certain set of criteria are provided by end user 12 and matched in the system. Profiles may be modified, updated, or otherwise changed where appropriate and based on particular needs.

Hotel marketability index element 18 is a software element operable to provide one or more resultant properties to end user 12 based on selected criteria. In one embodiment, hotel marketability index element 18 cooperates with a web server (and may be coupled thereto or stored thereon where appropriate) in order to display one or more results obtained from a given set of parameters, as specified by end user 12 and/or as designated by a system administrator. Alternatively, hotel marketability index element 18 may include any suitable hardware, processors, algorithms, modules, components, devices, objects, or elements (or any suitable combinations of these elements) operable to effectuate the operations thereof. In addition, hotel marketability index element 18 may include any of the other elements illustrated in FIG. 1 within its internal structure where appropriate. Their representation in FIG. 1 is offered for purposes of example and clarity only. System 10 enjoys considerable flexibility in that any of these elements may be provided in any other suitable location or combined where appropriate and in accordance with particular configuration needs. For example, hotel marketability index element 18 may include both a web server and a processor that are (collectively) operable to collect data and provide a given resultant set of properties based on that information to an interested end user.

The hotel marketability index scores may be the primary factors for the display on a given website (e.g. Travelweb.com). A given web sever may process properties using the descending order of the hotel marketability index scores stored on the server and provided by hotel marketability index element 18. Each property may then be checked for availability and displayed in the order it was processed. Higher scoring properties may receive a screen placement preference over lower scoring properties.

Data collection element 20 is a segment, node, or location within system 10 that may be used to store information or data associated with selected properties or locations that may be sought to be identified and/or evaluated by end user 12. Data collection element 20 may include software operable to provide an interface for communications involving hotel marketability index element 18. Alternatively, data collection element 20 may include any suitable hardware, algorithms, modules, components, objects, or elements operable to facilitate communications between itself and any other element included within system 10.

The data retrieved from external sources and stored in data collection element 20 (or alternatively in city clustering element 22) may be categorized as either property detail data or property performance data. With respect to the former, property detail data reflects information relating to the location or attributes of a specific hotel. The data may be collected in any suitable fashion, and properly stored in an appropriate storage location, for example, in a database included external to system 10 or provided internally within any of the elements of system 10. The database may be modified, audited, scrubbed, or periodically updated in any suitable manner based on particular needs. The specific hotel data may include property information, location information, amenity information, quality information, and/or any other suitable information associated with a given property.

With respect to the latter, property detail is associated with information about the property at a general level. Such information may include a property name, a chain code, ownership information, a hotel phone number, a hotel fax number, and/or a hotel e-mail address. In addition, such information may include personnel data such as, for example, revenue managers, reservations managers, or regional contacts.

Location information that is stored in data collection element 20 (or city clustering element 22) may provide a significant data driver in the hotel marketability index process. The location information may reflect the physical address of the property, including more specific information such as a corresponding street address, as well as city, state, postal code, and country information. Other information details may include the latitude and longitude of the property. Using the latitude and longitude of the property, city or area clusters may be generated or constructed in order to form geographic centers. Additional details relating to the cluster-building process are provided below with reference to FIG. 2.

Amenity information may be used by hotel marketability index element 18 and stored within data collection element 20 (or city clustering element 22). Dynamic scoring may be performed in response to consumers selecting hotels with certain amenities. For example, if a consumer searches for properties with a high-speed Internet connection, scoring operations could be rerun based only on those properties that meet this criteria.

Quality information in the hotel industry may be generally referred to as a "star rating." Star ratings may range between zero and five stars (five stars being an optimal score) and may be acquired from a variety of sources. For example, star ratings may be retrieved from the American Automobile Association (AAA) or from the Mobil Corporation. Additional sources may include Froemmer's, Conde Nast Publications, or the "Hotel Travel Index," each of which may provide consumers with estimates of a hotel's quality. Star ratings may also be provided based on consumer feedback obtained from a given entity.

Property performance data may be generally collected from internal sources. For example, two primary sources may be the log data from all lodging transactions and shopping data collected from another suitable location (e.g. tracking via Travelaxe software). With respect to the transaction log data, such information may reflect the time and the result of every availability request made from a given entity (e.g. the Pegasus Corporation) via a corresponding given server. When consumers perform hotel searches on any given website (or through affiliates of the operator of the website), the system may log the result of that request. This data may be referred to as availability data.

For requests that return rates, the log data may include the time of the transaction, the affiliate performing the transaction, the chain code and property identification of the requested hotel, the corresponding rates, the room types, the rate types, the check in/check out dates requested, the response time of the transaction, and any other suitable information associated with the request. Requests that fail to return rates may include the chain code and property identification, the error code indicating why the request returned no rates, and the consumer input information on the request (e.g. check in date, check out date, etc.).

A more specific type of log data may also be acquired using a direct access method. For this method, a listing of hotels with applicable check in and check out data may be communicated directly to an entity via a suitable proprietary gateway. The requests may return the same information as the normal entity logs, but may also return the non-merchant rates with the results. Such a process is not necessarily consumer driven. Instead, the process reflects a forced availability call generated by a given company.

Competitive shopping detail may be acquired using appropriate software (e.g. Travelaxe software). The software may perform a substantially simultaneous comparison of competing hotel sites and, further, collect rates for specific properties based on check in and check out dates. The software may also provide the hotel marketability index process with an average nightly rate and all applicable taxes and fees for booking on other competing travel websites. The data may be output and properly stored (locally in certain embodiments) in corresponding databases.

City clustering element 22 is a segment, node, or location within system 10 that may be used to store information or data associated with selected properties or locations that are sought to be identified and/or evaluated by end user 12. City clustering element 22 may include software operable to provide an interface for communications involving hotel marketability index element 18. Alternatively, city clustering element 22 may include any suitable hardware, modules, algorithms, components, objects, or elements operable to facilitate communications between itself and any other element included within system 10. In addition, city clustering element 22 may be provided within hotel marketability index element 18 or combined with any other element provided within system 10 where appropriate. In order to explain some of the details and operations associated with city clustering element 22, reference is made to FIG. 2.

Figure 2:
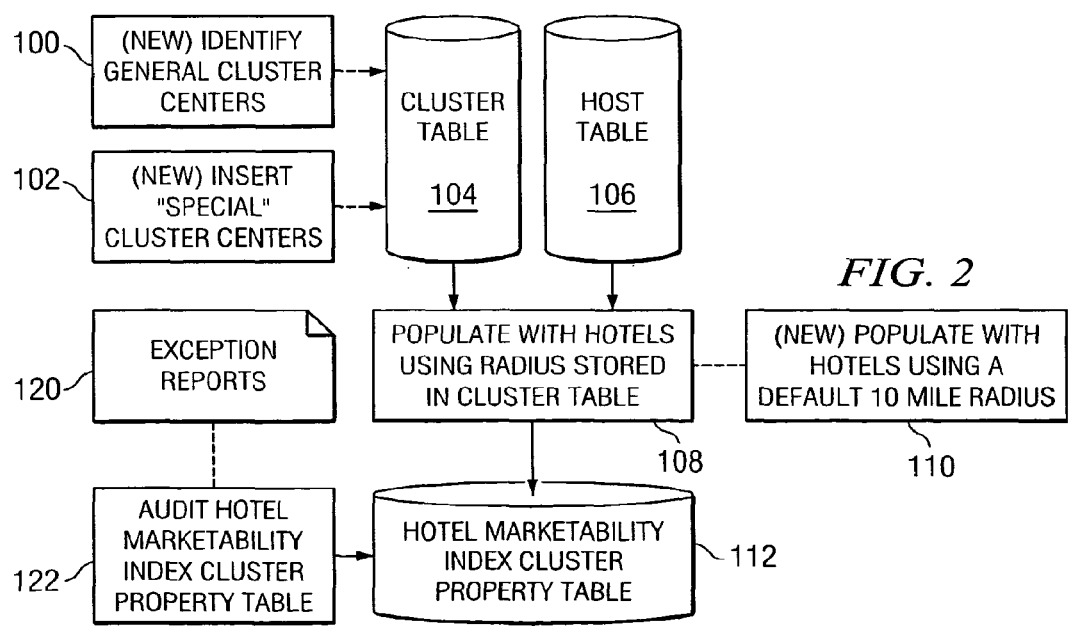
FIG. 2 is a simplified block diagram of an example city clustering process associated with the travel accommodation system.

FIG. 2 is a simplified block diagram of an example city clustering process associated with a travel accommodation operation to be performed in system 10. The city clustering process of FIG. 2 illustrates a cluster table 104, a hotel table 106, and a hotel marketability index cluster table 112. Cluster table 104 and hotel table 106 may be coupled to a hotel marketability index cluster property table 112 directly or via any suitable interface. These elements may interface with each other in order to properly identify, store, and (potentially) display a given set of clusters to be reviewed or evaluated by end user 12. A number of steps may be performed that implicate the corresponding elements such that a resultant set of clusters are generated.

The city clustering process may begin at steps 100 and 102, where cluster centers may be identified and where special cluster centers may be inserted into cluster table 104. During an initial execution of the city clustering process, all properties may be treated as new properties. The process may identify all of the physical cities contained within hotel table 106 and use suitable mapping software (for example Microsoft Mapoint) to specify a city center for that city. Unique occurrences associated with a city and/or its center may then be formulated or processed as clusters. Additionally, specific cities or areas may be assigned overrides for their city center. The overrides may be reflected by a set of exception reports 120 that are provided in the context of auditing hotel marketability index cluster property table 112 at step 122. For example, geographically, the city center of New York City might be at Location A, but from a consumer point of view the actual city center is at Location B. Thus, Location B may be identified as the true city center and the latitude and longitude values for the override city center may be added to hotel marketability index cluster property table 112.

In operation, cluster table 104 and hotel table element 106 may store information provided by the operations performed in steps 100 and 102. By using the latitude and longitude values stored with each specific property, hotels may be assigned the cluster identification of any cluster where their latitude and longitude value is within the mileage threshold of the cluster center. For example, for certain clusters, if the city center is in Location A, then any hotel within ten miles (which may be provided as the default threshold as illustrated by step 110) of Location A may be assigned to that particular cluster. Thus, hotels may be populated using a given radius as stored in hotel marketability index cluster property table 112, as illustrated by step 108. Other clusters may have a threshold of two miles for densely populated areas or more than ten miles for sparsely populated areas. All deviations from the default threshold may be determined by an individual analysis of the original processing. Such decisions may be executed by a consumer or selected by a system administrator.

Figure 3:
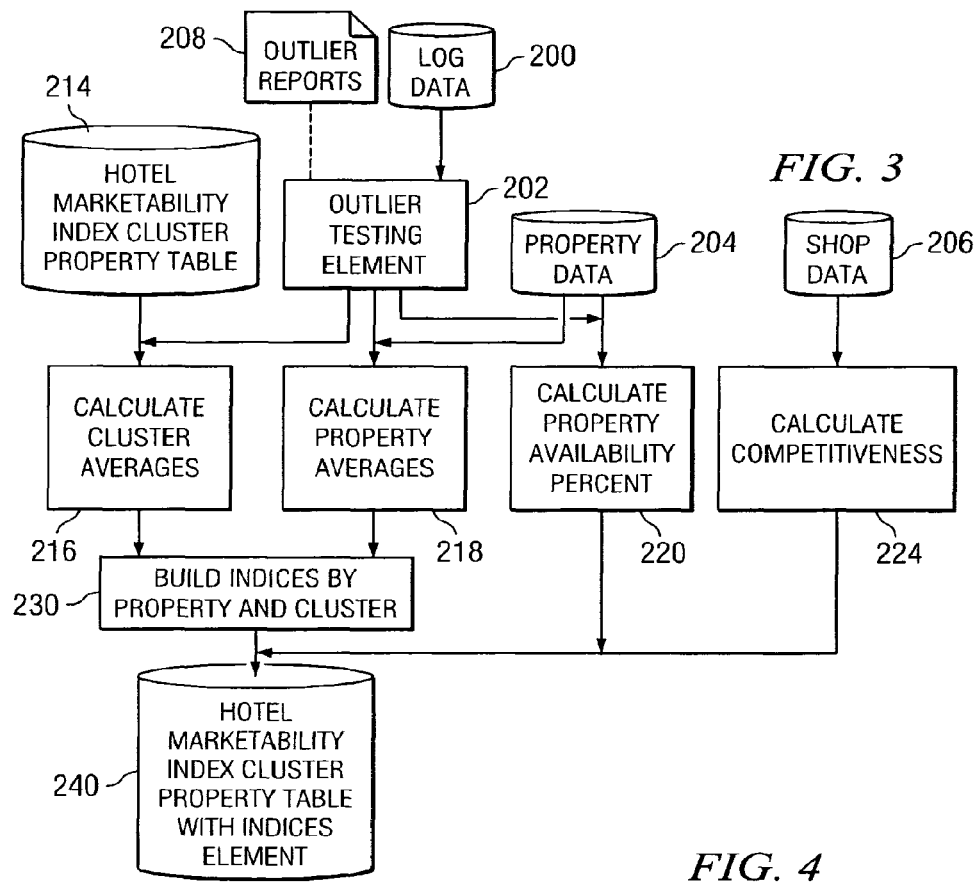
FIG. 3 is a simplified block diagram of an example metric and index-building process associated with the travel accommodation system.

FIG. 3 is a simplified block diagram of an example metric and index-building process associated with system 10. The architecture of FIG. 3 may be used in order to provide a more accurate resultant set of properties identified by hotel marketability index element 18 by removing or accounting for information that skews data or misrepresents true property characteristics. FIG. 3 may include log data 200, property data 204, shop data 206, and a hotel marketability cluster property table 214. Prior to any processing of averages and indices, outlier data may be removed based on a set of outlier reports 208 that are communicated to an outlier testing element 202, which also receives portions of log data 200.

Outlier data reflects abnormal information that may be a result of (for example) certain hotels providing extremely high rates for particular properties, whereby the irregular information skews their averages. For example, property rates in the $10,000 plus range may dramatically affect a given set of properties of a selected corporate entity. In order to provide a more pure average, an outlier process may be executed that eliminates data more than three standard deviations from the normal output value for all given inputs. An exception to this process might be associated with the availability percentage, where no modifying of data is performed. Such decisions may be executed by a consumer or selected by a system administrator.

A next step in the metric and index-building process may be to create a set of averages within each cluster, from which indices may be built. For example, the following averages may be maintained using all hotels within a given cluster: average nightly rate within a general cluster, average nightly rate within a specific cluster, average nightly rate within a cluster and quality, average hotel quality within a cluster, and average distance from a cluster center. Other specific measures for each hotel, within a cluster, may also be collected. These measures may include: property average nightly rate within a general cluster, property average nightly rate within a specific cluster, property average nightly rate within a cluster and quality, property average hotel quality within a cluster, property average distance from a cluster center, property availability percentage by check in and check out date, property merchant rate to retail rate discount (value to retail), and property competing site competitiveness score. One or more of these elements may be compared against averages to create indices. Thus, outlier testing element 202 may communicate resultant data, along with hotel marketability index cluster property table 214, in order to calculate cluster averages at step 216.

Similarly, outlier testing data may be used in conjunction with property data 204 in order to calculate property averages at step 218. In addition, outlier testing data may be used in conjunction with property data 204 in order to calculate a property availability percentage at step 220. Step 216 may be used in conjunction with step 218 in order to build indices by property and cluster at step 230. Additionally, shop data 206 may be used in order to calculate competitiveness at step 224, which may be provided in conjunction with the resultant of step 220 to hotel marketability index cluster property table with indices element 240. Hotel marketability index cluster property table with indices element 240 may also receive suitable data from step 230, which builds indices by property and cluster.

Individual property information may be indexed against the average for the given cluster. This may result in a series of comparative indices for each property in each of the categories, as described supra. Indices may then be created for the following: rate within a general cluster, rate within a specific cluster (which may only be performed for those hotels that appear in specialty clusters, e.g. the Financial District in New York), rate within cluster and quality, quality within a cluster, and a distance within a cluster.

The remaining indices may be generated using individual property information. For example, an index may be generated reflecting the availability percentage by check in and check out date, which represents the number of requests that returned an available rate divided by the total number of requests for a specific check in and check out date. In addition, an index may be generated that reflects a value to retail figure, which represents a comparison of the property's lowest merchant rate to its lowest retail value in order to produce a percent discount off retail value. For example, if the lowest merchant rate is $90 and the lowest retail rate is $100, then the VTR (Value to Retail) is 90/100 or a 0.90. An index may also be created that reflects a property competing site competitiveness score, which provides a calculation representing a "win and loss" percentage against competing sites based on a variety of trials that are executed. A property may earn credit for a "win" when they post a rate no more than $3 higher than that which is available for the same accommodations on a competing site (e.g. Expedia or Hotels.com). A "loss" may be credited when a given property offers a better rate (by $3) on competing sites.

Figure 4:
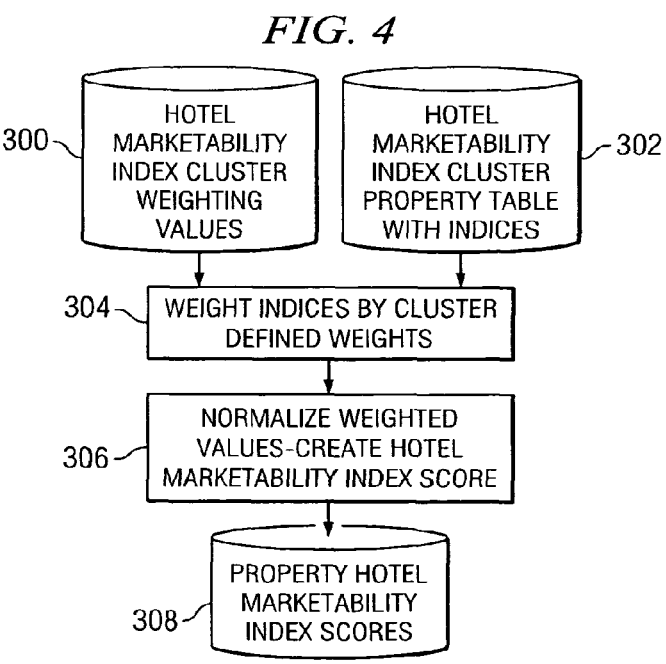
FIG. 4 is a simplified block diagram of an example index-weighting and normalized-scoring process associated with the travel accommodation system.

FIG. 4 is a simplified block diagram of an example index-weighting and normalized-scoring process associated with system 10. FIG. 4 may include a hotel marketability index cluster property table with indices element 302, which may be combined with hotel marketability index-weighting values 300 to be used at step 304 to produce weight indices by cluster defined weight. Weighted values may be normalized at step 306 in order to create a hotel marketability index score. Step 308 reflects the appropriate storage of property hotel marketability index scores for a number of properties. These scores may be displayed to end user 12 based on a given search or inquiry.

The final step of the process of FIG. 4 applies the weights that were defined to each cluster against the indices created form the data. Weights may be defined individually using specific characteristics of each cluster. For example, such characteristics may include: the radius of the cluster, higher proximity weight for larger geographic areas, quality of hotels in cluster, higher weights if area has a wider range of hotel quality, regional price sensitivity, economic factors affecting an area or any other suitable information. Weights may be applied to the indices and a score may then be generated. The scores may be normalized so that properties with an index of one (completely average) receive a mid-point of the weight. For example, if the weight of the star quality is worth thirty points, a completely average property (an index of one) would receive a fifteen added to their score. A higher quality hotel (an index of two) may receive twenty-five or thirty points, but no more than thirty points in one example scenario.

Once all of the weights have been applied and normalized, the total scores may be summed into a final score. Bonus points may then be added for properties with addresses in the city limits of the search (e.g., add ten points for a property located in Dallas, Tex. when a Dallas search is being performed, but do not add ten points for being in Irving, Tex. for such a search). Additional bonus points may be added for properties associated with a contractual engagement with a given entity. A final adjustment may allow a given entity to preference its own properties over retail properties.

In operation of an example embodiment, which is provided for purposes of teaching only, hotel marketability index element 18 may execute a scoring procedure that preferences properties based on the likelihood of a sales conversion within a geographic region or cluster. Hotel properties may be clustered using latitude and longitude data associated with geographic areas. In one example, a twenty-five mile radius from a city center or point of interest may be used. The radius may shrink/grow based on the density of properties within a target area. Each geographic area may result in a cluster of hotels that compete against each other for business. From the "city center" a circle may be drawn that encompasses a twenty-five mile spacing in each direction in order to build a base for the cluster. Each cluster may then be populated with a suitable number (e.g. one-hundred) hotel properties. The property threshold can be either increased or decreased for any given cluster based on particular needs. Sub-clusters can be created for larger metropolitan areas using more precise definitions where appropriate.

Any suitable number of parameters may be used as criteria in order to provide end user 12 with a suitable selection of travel accommodation characteristics. In one example embodiment, rate competitiveness, hotel availability, hotel location within the cluster (proximity), and hotel quality within the cluster (potentially star-based) are used and may be provided as options to be approved or disregarded by end user 12 (e.g. using a web-page accessed via the Internet). Other parameters, as described herein, may be implemented by end user 12 or a system administrator to narrow the corresponding search. A set of lodging properties that match the criteria provided by end user 12 may be returned and suitably displayed. End user 12 may then consummate the sale by providing a credit card or by suitably debiting his account. End user 12 may also finalize a property sale in any other suitable manner where appropriate and based on particular needs.

FIGS. 5 through 8B are provided in order to illustrate some potential operations to be performed within system 10. It is critical to note that these arrangements and configurations are offered for purposes of example and teaching only and, accordingly, should not be construed in any way to limit the scope or applications of system 10. System 10 enjoys considerable flexibility in that in may be implemented in conjunction with any suitable architecture and cooperate with any system parameters in order to achieve an optimal platform from which end user 12 may be provided with information associated with travel accommodations.

FIG. 5 is a simplified web-page illustration 400 that shows an example operation, offering a rate being provided within a cluster index in accordance with one embodiment of the present invention. The illustration of FIG. 5 references the Midtown East cluster of New York City, N.Y. and shows four segments, including a property name column, a number (#) of availability requests column, an average lowest rate returned column, and a price to cluster index column. For the set of properties within a cluster (provided in the first column of FIG. 5), a weighted average rate is derived from all availability requests. Each individual property's average rate may then be compared to the weighted average rate for the cluster. A rate within a cluster index is then created. In addition, a weighted average rate 402 may be displayed that is based on the cluster that was sampled.

In the context of a rate within a star quality index, properties with the same star rating may be used to derive the weighted average rate. With respect to the rate within a market index, a cluster may be expanded to the general area and a second index may be created. Note that this may apply in scenarios where the metropolitan area is large enough to create sub-clusters. In order to account for a value metric, a value to retail index may also be created. Using shopping data acquired via any suitable source (e.g. Travelaxe software) the competitive "win-loss percentage" may then be derived. A given rate associated with one entity (e.g. Travelweb.com) may be compared independently against other entities (e.g. Expedia and Hotels.com) for a variety of dates.

As described supra, wins may then be achieved where Travelweb.com has the selected rate and the competing entity does not or in cases where Travelweb.com and the competing entity both have rates and the Travelweb.com rate is no more than $3 higher than the competing rate. Losses may be recorded where the competing entity has a selected rate and Travelweb.com does not, or where the competing entity and Travelweb.com both have rates and the Travelweb.com rate exceeds the competing entity by more than $3. If a given property has three instances of wins and one instance of a loss, the property may be given a 75% competitive score.

Hotel availability may represent a significant component of the hotel marketability index process. All availability requests for a previous week may be considered when deriving the hotel marketability index scores. A significant weight may also be placed on the previous day. Hotel availability may be calculated on a check-in and length-of-stay basis. For example, a property may have different availability percentages for a check-in on April-20 for two days than it does for a check in on April-20 for one day. In instances where the check-in or length of stay patterns are unavailable, a weighted average availability percentage may be derived using a prescribed average pattern.

Check-in dates beyond thirty days may be summed into more general categories, for example: thirty-one to sixty days, sixty-one to ninety days, or ninety-one to one-hundred twenty days. In situations where distributors cannot apply (or choose not to apply) availability at the lower "check-in/length of stay" level, the data can also be used in the context of the weighted-average approach.

FIG. 6 is a simplified web-page illustration 500 that shows an example operation that offers a hotel availability sampling in accordance with one embodiment of the present invention. The hotel availability component of system 10 is offered in order to emphasize the importance of having a suitable number of vacancies to accommodate a given traveler who seeks appropriate lodging. Segments 502, 504, 506, and 508 illustrate that there is no Saturday check in available (0%) in March and April for the Omni Berkshire Place property. In addition, segments 520, 522, and 524 illustrate that dates that are at times further in the future only have availability for stays that are more than two nights. Thus, no availability exists for two-night stays (or less) for time frames between ninety-one and one-hundred eighty-one days (plus) for this particular property (Omni Berkshire Place).

Hotel marketability index element 18 may use the hotel's geographic location as a component of its score. The distance from a city center for each hotel may be calculated. City centers may be available for each cluster. Thus, a single property could have several different proximities based on the area being searched. For example, The Waldorf Astoria, located at 301 Park Avenue, has the following proximities in the New York area: New York (General) 0.3 Miles, Midtown East 0.5 Miles, Midtown West 0.7 Miles, Lower East 1.7 Miles, Lower West 1.8 Miles, Upper East 0.4 Miles, Upper West 0.6 Miles, Financial District 3.8 Miles, Central Park South 0.5 Miles, Central Park West 1.5 Miles, and Brooklyn 19 Miles. There are approximately thirty other proximities beyond Brooklyn.

FIG. 7 is a simplified web-page illustration 600 that shows an example operation that offers a relative star quality sampling in accordance with one embodiment of the present invention. Similar to the various rate indices, a star quality index may be created by comparing each hotel's star rating to the average hotel star rating within the cluster. This may keep a two-star hotel (e.g. Club Quarters Midtown) that is located in the middle of ten four-star hotels from premier placement on the screen. In the example of FIG. 7, the average star index is provided as 3.42.

Thus, hotels may be compared to other hotels within their clusters based on the quality of the property. In order to estimate the quality associated with a given property, hotel marketability index element 18 may use the average star rating acquired from any suitable source. Such an operation may be reduced to a preferred rating service or a proprietary rating may be developed and implemented. Ratings that clearly deviate from the normal rating may be eliminated in calculating the average. For example, if AAA and Mobil rated a given property as a four-star location, and Expedia rated the same location with only one star, the Expedia rating may be eliminated.

FIG. 8A is a simplified web-page illustration 700 that shows an example of weighting components into a single score within system 10 in accordance with one embodiment of the present invention. The components may be weighted on a two-hundred point basis and the weights may vary by cluster/market. For example, the proximity weight in New York City, N.Y. (where hotels are close to one another) is more significant than in Dallas, Tex. (where they are less dense). Additionally, the star within a cluster weight is more significant in San Francisco, Calif. where a four-star property may be on the same block as a two-star property. Note also that, as illustrated by FIG. 8A, a suitable set of default values may also be provided in such an arrangement based on particular lodging needs or designated travel characteristics.

FIG. 8B is a simplified web-page illustration 800 that shows an example of weighting components into a single score within the travel accommodation architecture of system 10 in accordance with one embodiment of the present invention. The weights designated may become even more influential when they are event-driven. FIG. 8B illustrates that two important factors, value to retail and availability, remain unchanged by a consumer event. Considerable flexibility is provided by hotel marketability index element 18 in that any characteristic or parameter may be used to affect or influence a selected lodging factor.

Hotel marketability index element 18 may also be used by a hosting entity in providing feedback information or consultations to a supplier or a property owner/manager (e.g. indicating ways that a supplier could improve their hotel marketability index score). Thus, system 10 provides an opportunity for an administrator or a sales representative to communicate with existing properties and attract new properties that may be used in offering an optimum number of choices to end user 12. The sales representative may be able to provide properties with relative performance indicators regarding how they are being displayed on the screen and how they can improve screen placement. Lodging characteristics of a given entity may be stored in an entity profile. The lodging characteristics may reflect any suitable information relating to locations associated with the entity such as, for example, data used to generate the hotel marketability index score. Other lodging characteristics could reflect market share values, recent sales trends, improvements or deficiencies in one or more of the properties owned by the entity, or any other suitable or germane information that may be of interest to the entity.

Any administrator or sales representative associated with the hosting entity of system 10 may also be able to demonstrate to new/potential properties how the hotel marketability index process can increase conversion figures and reduce time-intensive record-keeping (i.e. looks-to-books, as it is commonly referred to in the travel industry). An administrator may also be able to readily identify poor performing hotels and utilize a tool that offers solutions or suggested improvements to performance problems with the use of quantitative data.

In operation of an example embodiment, managers of existing or new properties may access information provided by hotel marketability index element 18 via any suitable user interface, or simply log-on through their corporate account in order to determine how they can improve their score or enhance the value that is being offered to the customer. The information provided may offer an opportunity for suppliers to pinpoint areas of weakness. For example, a supplier may see that their star quality is suffering dramatically and, accordingly, address that area in order to improve their index score. A hosting entity associated with hotel marketability index element 18 may also provide properties with relative performance documentation or reports (e.g. via monthly reporting) regarding how the properties are being displayed on a corresponding web-site. Poor-performing hotels may also be identified and be provided with an accurate and a consistent measurement tool (hotel marketability index scores) that allows such hotels to change their strategy or enhance elements of their business practice that are contributing to weaknesses in their hotel marketability index score. In egregious cases, poor-performing hotels that fail to improve may be de-listed from a database within hotel marketability index element 18 such that they are not displayed to end user 12 for a potential sale.

As described above, the elements and operations represented in FIGS. 2-8B may be effectuated within the architecture of system 10. FIG. 1 generally represents just one electronic environment or network configuration for one or more of the elements within FIGS. 2-8B to utilize in performing one or more of their operations. Accordingly, alternative communications capabilities, data processing features, infrastructure, and any other appropriate software, hardware, or data storage objects may be included within FIG. 1 to effectuate the tasks and operations of the elements and activities associated with any of the embodiments of FIGS. 2-8B. For example, hotel marketability index element 18 may be utilized in conjunction with a cellular telephone via a wireless local area network (WLAN) in order to secure adequate travel accommodations. Additionally, hotel marketability index element 18 may be provided as a software package to be sold to any individual interested in being able to perform such searching capabilities. A purchasing consumer may receive periodic updates from an administrative entity such that the most current data associated with relevant lodgings is provided to the individual. FIG. 1 provides just one of a myriad of suitable processing or communication platforms from which system 10 may operate.

Although the present invention has been described in detail with reference to particular embodiments in FIGS. 1-8B, it should be understood that various other changes, substitutions, and alterations may be made thereto without departing from the spirit and scope of the present invention. For example, although the present invention has been described as operating in a hotel accommodation environment, any suitable business endeavor may benefit from the teachings of the present invention. For example, a rental-car company may use system 10, whereby a series of indices are provided in order to direct or control a marketability index score. The score could be based on similar components (as identified herein) or use other suitable parameters for evaluating a given set of travel accommodations. Similarly, various other suitable business structures or reservation-based operations that seek to secure suitable accommodations may benefit from the teachings of system 10.

Additionally, it should be noted that although the example embodiments have described certain steps or operations to be performed, these operations and processes may be modified considerably without departing from the teachings of the present invention. In addition, other steps may added and selected steps may be deleted: such changes being the result of particular system configurations, specific architectural arrangements, or designated parameters. These modifications are within the scope of system 10 and may be based on particular operational needs.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for indexing travel accommodation search results using an end user profile, comprising means for processing instructions to:

create an end user profile operable to store data associated with one or more travel characteristics of the end user and a plurality of end user consumer events, wherein the end user profile is coupled to a hotel marketability index that is operable to identify a plurality of hotel properties and to assign a hotel marketability index score to one or more of the properties such that one or more of the properties are rankable, the hotel marketability index score being based on a weighted sum of one or more travel characteristics associated with one or more of the hotel properties, wherein weights of the travel characteristics associated with one or more of the hotel properties vary according to an occurrence of one or more end user consumer events, wherein the travel characteristics associated with one or more of the hotel properties include hotel location within a cluster location, hotel quality within the cluster location and at least one of rate competitiveness and hotel availability, and wherein the plurality of end user consumer events include the end user sorting hotels by proximity and at least one of rate, star ranking, and value;

determine a hotel result ordering, in response to a hotel search request by the end user, using a default hotel result ordering based on a default hotel marketability index; and modify the determined hotel result ordering based on the one or more travel characteristics of the end user and the hotel marketability index.

2. The apparatus of claim 1, wherein one or more unsolicited communications associated with available lodging are sent to the end user based on the profile of the end user and a likelihood of the end user being interested in the available lodging.

3. The apparatus of claim 1, wherein one or more coupons are sent to the end user based on the profile of the end user, the coupons being associated with available lodging and being offered in order to encourage a sales conversion of the available lodging.

4. The apparatus of claim 1, wherein the end user is provided an opportunity to modify the profile such that the data associated with one or more travel characteristics of the end user are changeable.

5. A processor-implemented method for indexing travel accommodation search results using an end user profile, comprising:

storing, by the processor, data associated with one or more travel characteristics of an end user and a plurality of end user consumer events in a profile, wherein the profile is coupled to a hotel marketability index that is operable to identify a plurality of hotel properties and to assign a hotel marketability index score to one or more of the properties such that one or more of the properties are rankable, the hotel marketability index score being based on a weighted sum of one or more travel characteristics associated with one or more of the hotel properties, wherein weights of the travel characteristics associated with one or more of the hotel properties vary according to an occurrence of one or more end user consumer events, wherein the travel characteristics associated with one or more of the hotel properties include hotel location within a cluster location, hotel quality within the cluster location and at least one of rate competitiveness and hotel availability, and wherein the plurality of end user consumer events include the end user sorting hotels by proximity and at least one of rate, star ranking, and value;

determining a hotel result ordering, in response to a hotel search request by the end user, using a default hotel result ordering based on a default hotel marketability index; and modifying the determined hotel result ordering based on the one or more travel characteristics of the end user and the hotel marketability index.

6. The method of claim 5, further comprising:

sending one or more unsolicited communications associated with available lodging to the end user based on the profile of the end user and a likelihood of the end user being interested in the available lodging.

7. The method of claim 5, further comprising:
sending one or more coupons to the end user based on the profile of the end user, the coupons being associated with available lodging and being offered in order to encourage a sales conversion of the available lodging.

8. The method of claim 5, further comprising:
identifying a cluster center;
assigning a cluster radius to the cluster center;
determining a hotel property distance of at least one hotel property of the plurality of hotel properties from the cluster center;
comparing the hotel property distance to the cluster radius; and
associating the at least one hotel property with the cluster center when the hotel property distance is less than the cluster radius based on comparing.

9. The method of claim 8, wherein the cluster radius depends on a population density associated with the cluster center.

10. The method of claim 5, wherein the end user is provided an opportunity to modify the profile such that the data associated with one or more travel characteristics of the end user are changeable.

11. The apparatus of claim 1, further comprising instructions to:
identify a cluster center;
assign a cluster radius to the cluster center;
determine a hotel property distance of at least one hotel property of the plurality of hotel properties from the cluster center;
compare the hotel property distance to the cluster radius; and
associate the at least one hotel property with the cluster center when the hotel property distance is less than the cluster radius based on comparing.

12. The apparatus of claim 11, wherein the cluster radius depends on a population density associated with the cluster center.

13. An non-transitory medium storing travel accommodation search results indexing instructions to:
create an end user profile operable to store data associated with one or more travel characteristics of the end user and a plurality of end user consumer events,
wherein the end user profile is coupled to a hotel marketability index that is operable to identify a plurality of hotel properties and to assign a hotel marketability index score to one or more of the properties such that one or more of the properties are rankable, the hotel marketability index score being based on a weighted sum of one or more travel characteristics associated with one or more of the hotel properties,
wherein weights of the travel characteristics associated with one or more of the hotel properties vary according to an occurrence of one or more end user consumer events,
wherein the travel characteristics associated with one or more of the hotel properties include hotel location within a cluster location, hotel quality within the cluster location and at least one of rate competitiveness and hotel availability, and
wherein the plurality of end user consumer events include the end user sorting hotels by proximity and at least one of rate, star ranking, and value;
determine a hotel result ordering, in response to a hotel search request by the end user, using a default hotel result ordering based on a default hotel marketability index; and
modify the determined hotel result ordering based on the one or more travel characteristics of the end user and the hotel marketability index.

14. The medium of claim 13, wherein one or more unsolicited communications associated with available lodging are sent to the end user based on the profile of the end user and a likelihood of the end user being interested in the available lodging.

15. The medium of claim 13, wherein one or more coupons are sent to the end user based on the profile of the end user, the coupons being associated with available lodging and being offered in order to encourage a sales conversion of the available lodging.

16. The medium of claim 13, wherein the end user is provided an opportunity to modify the profile such that the data associated with one or more travel characteristics of the end user are changeable.

17. The medium of claim 13, further comprising instructions to:
identify a cluster center;
assign a cluster radius to the cluster center;
determine a hotel property distance of at least one hotel property of the plurality of hotel properties from the cluster center;
compare the hotel property distance to the cluster radius; and
associate the at least one hotel property with the cluster center when the hotel property distance is less than the cluster radius based on comparing.

18. The medium of claim 13, wherein the cluster radius depends on a population density associated with the cluster center.

* * * * *